(12) United States Patent
Yaeger

(10) Patent No.: US 7,510,156 B1
(45) Date of Patent: Mar. 31, 2009

(54) ELECTRONIC EQUIPMENT ATTACHMENT FRAME

(76) Inventor: Walt Yaeger, 12453 Whitworth Pl., Tustin, CA (US) 92782

( * ) Notice: Subject to any disclaimer, the term of this patent is extended or adjusted under 35 U.S.C. 154(b) by 417 days.

(21) Appl. No.: 11/121,200

(22) Filed: May 3, 2005

(51) Int. Cl.
 *E04G 3/00* (2006.01)
(52) U.S. Cl. ............................. 248/284.1; 248/201
(58) Field of Classification Search ............... 248/317, 248/324, 284.1, 201, 121, 282.1, 286.1, 285.1, 248/917, 921, 922, 924, 323, 274.1; 211/99, 211/104
See application file for complete search history.

(56) References Cited

U.S. PATENT DOCUMENTS

| | | | | |
|---|---|---|---|---|
| 623,790 | A * | 4/1899 | Kenyon | 359/860 |
| 661,051 | A * | 11/1900 | Horton | 359/860 |
| 3,550,892 | A * | 12/1970 | Propst | 248/282.1 |
| 3,586,278 | A * | 6/1971 | Simons | 248/165 |
| 5,876,008 | A * | 3/1999 | Sweere et al. | 248/325 |
| 5,934,636 | A | 8/1999 | Cyrell | |
| D423,910 | S | 5/2000 | Cyrell | |
| 6,394,404 | B1 | 5/2002 | Cyrell | |
| 6,554,242 | B2 * | 4/2003 | Kim | 248/371 |
| 6,604,722 | B1 * | 8/2003 | Tan | 248/276.1 |
| 7,097,143 | B2 * | 8/2006 | Kim et al. | 248/201 |
| D530,595 | S * | 10/2006 | Lam et al. | D8/373 |
| D560,671 | S * | 1/2008 | Muday et al. | D14/451 |
| D560,672 | S * | 1/2008 | Muday et al. | D14/451 |
| D565,054 | S * | 3/2008 | Anderson et al. | D14/452 |
| 7,448,584 | B2 * | 11/2008 | Chen et al. | 248/278.1 |
| 2007/0023593 | A1 * | 2/2007 | Fedewa | 248/201 |

OTHER PUBLICATIONS

Omnimount Systems, Inc, product information papers, 6 pages—years 2004/2005.

* cited by examiner

*Primary Examiner*—Gwendolyn Baxter
(74) *Attorney, Agent, or Firm*—Dennis W. Beech

(57) ABSTRACT

The present invention may be used for attachment to a vertical structural element such as a building wall for support of an electronic display. A wall mount frame may have two wall mount brackets spaced apart, slidably disposed and fixedly attachable on two horizontal adjustment bars inserted in two bar apertures in each of the wall mount brackets. There may be an articulating arm assembly rotatably attached at a first extension arm by a wall mount hinge to the two horizontal adjustment bars. An equipment attachment frame may be rotatably attached to a second extension arm of the articulating arm assembly by a frame hinge.

17 Claims, 5 Drawing Sheets

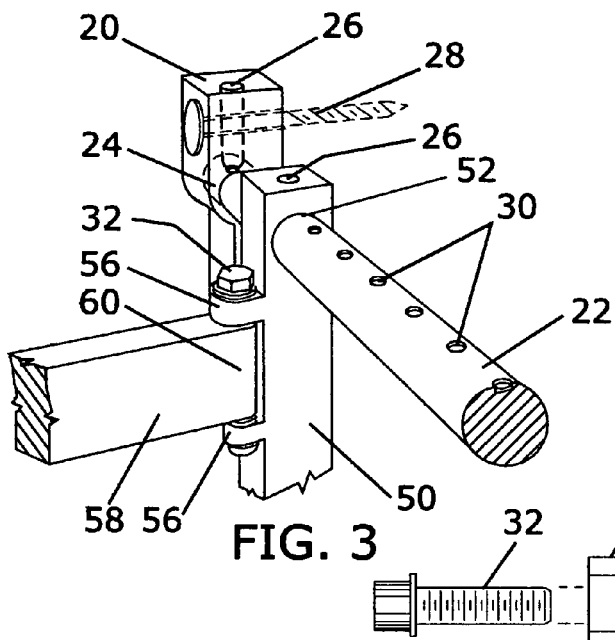
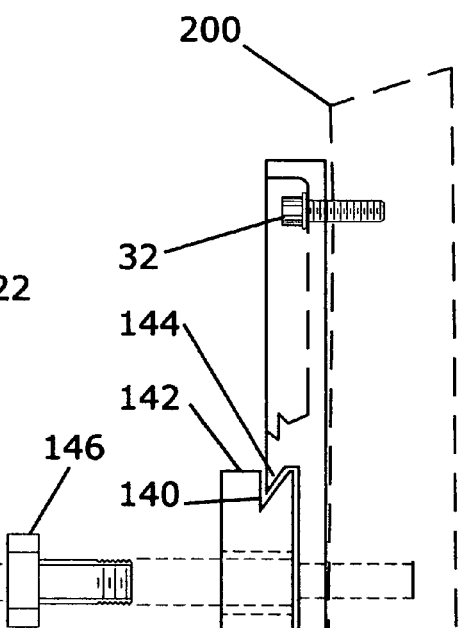
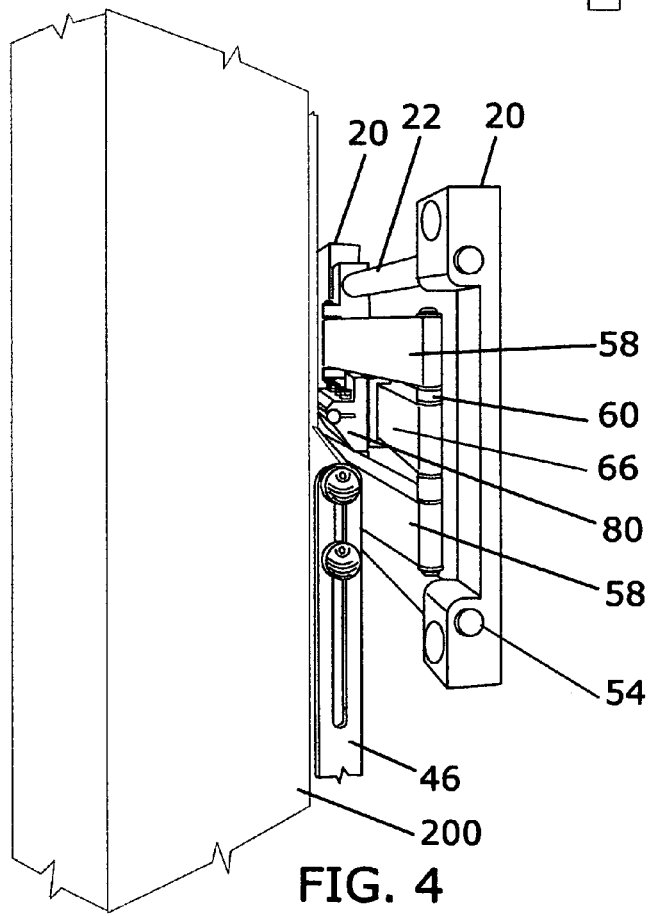

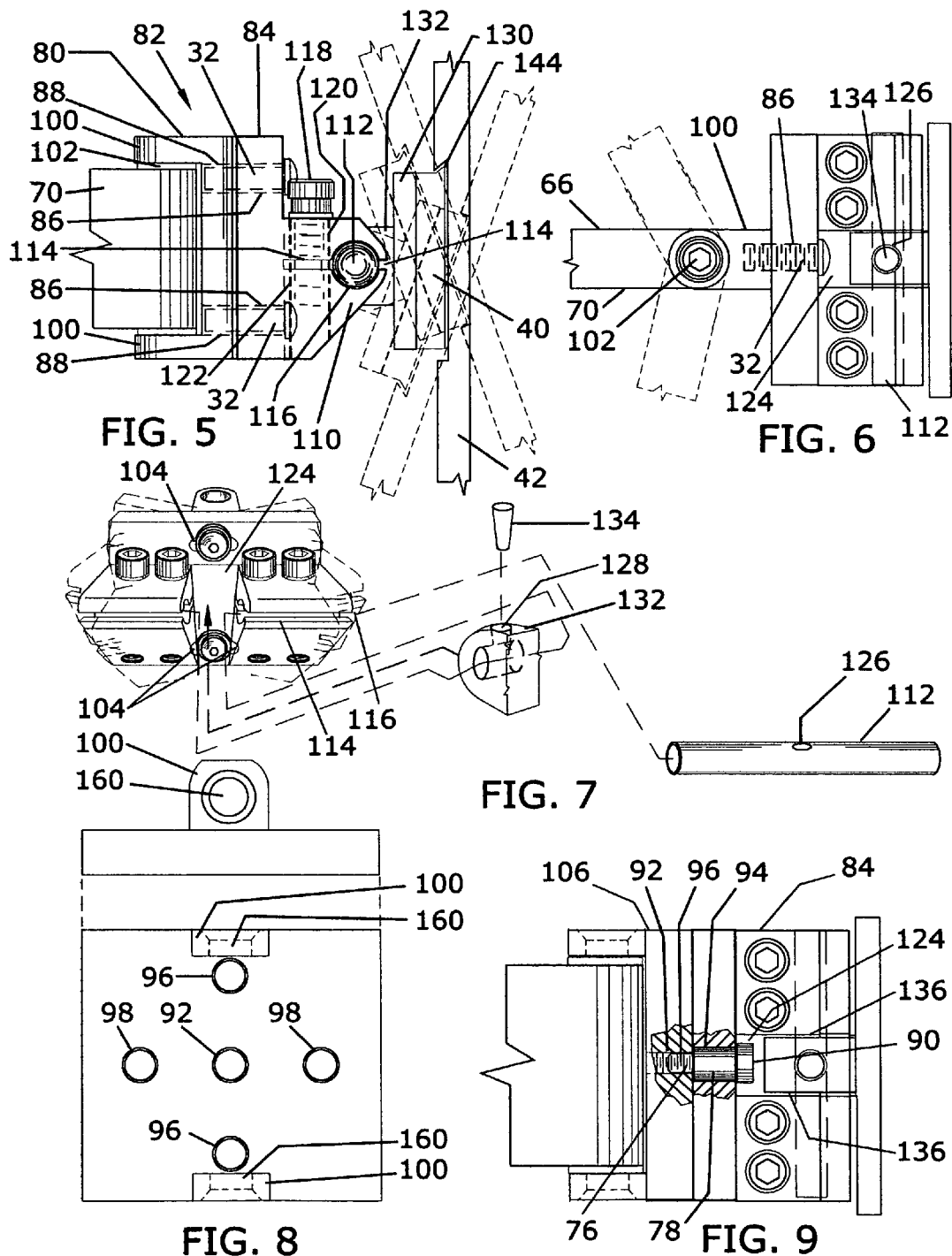

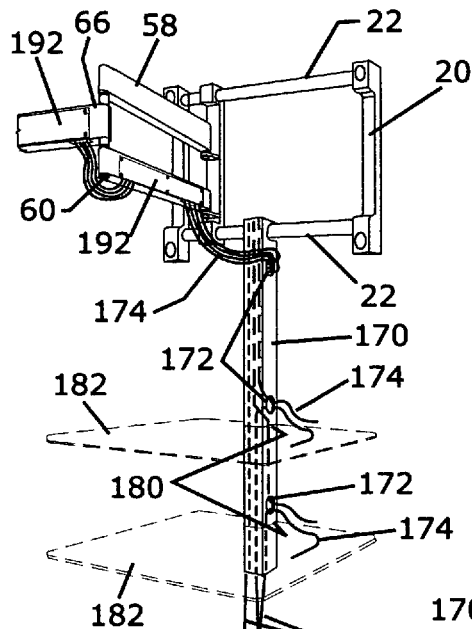
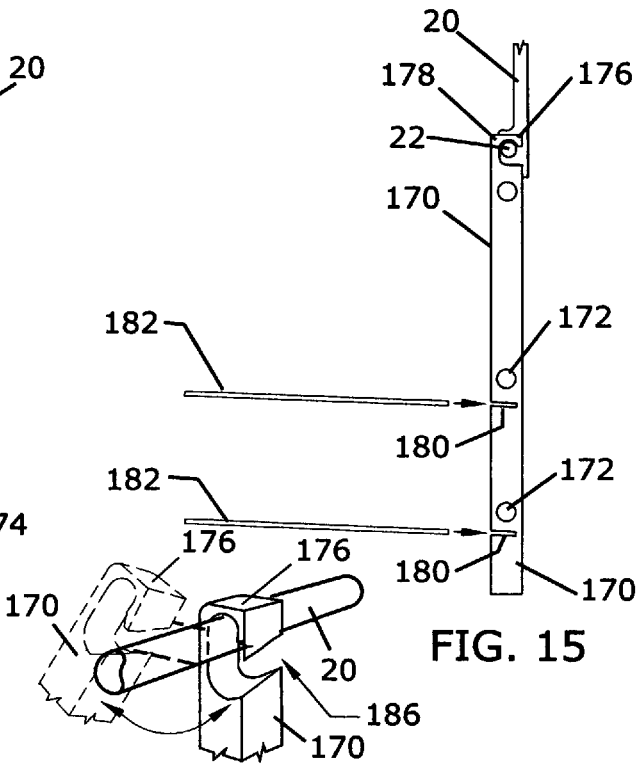
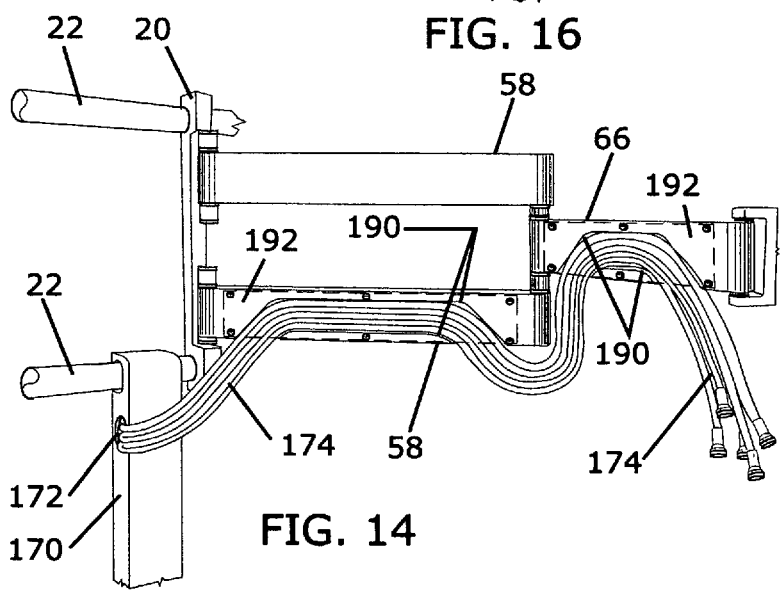

ELECTRONIC EQUIPMENT ATTACHMENT FRAME

BACKGROUND OF THE INVENTION

This invention relates to devices for attachment to a vertical structural element such as a building wall for support of an electronic display and positioning of the electronic display for viewing by a user. The new attachment frame may have a wall mount frame, an articulating arm assembly and an equipment frame to facilitate attachment of a display to a generally vertical structure and positioning of the display for viewing by a user.

Various wall mount and ceiling mount devices may be in use for television sets and other display systems. These devices generally incorporate some form of platform or shelf that has structural elements to attach the platform to a vertical structure or a ceiling. There may be some structural elements that allow limited adjustment of the tilt or horizontal orientation of the television or display for viewing by a user. There may also be cantilevered or articulated arm devices for attachment to a wall or generally vertical structure to allow hinged movement and extension away from an attached location of a display such as a flat panel display. However, these devices may be limited in the range of rotational orientation or movement of a display to accommodate a user. Such devices may also be difficult to install considering the size and weight of a display.

SUMMARY OF THE INVENTION

The present invention is directed to devices for attachment to a vertical structural element such as a building wall for support of an electronic display. A wall mount frame may have two wall mount brackets spaced apart, slidably disposed and fixedly attachable on two horizontal adjustment bars inserted in two bar apertures in each of the wall mount brackets. There may be an articulating arm assembly rotatably attached at a first extension arm by a wall mount hinge to the two horizontal adjustment bars. An equipment attachment frame may be rotatably attached to a second extension arm of the articulating arm assembly by a frame hinge.

These and other features, aspects and advantages of the present invention will become better understood with reference to the following drawings, description and claims.

BRIEF DESCRIPTION OF THE DRAWINGS

FIG. 3 illustrates a partial perspective view of a wall mount and wall mount hinge portion of the frame according to an embodiment of the invention;

FIG. 4 illustrates a side perspective elevation view of the frame in a folded position according to an embodiment of the invention;

FIG. 5 illustrates a side elevation view of a frame hinge according to an embodiment of the invention;

FIG. 6 illustrates a top view of a frame hinge according to an embodiment of the invention;

FIG. 7 illustrates a front elevation partially exploded view of a frame hinge according to an embodiment of the invention;

FIG. 8 illustrates a front and top view of a hinge receiver according to an embodiment of the invention;

FIG. 9 illustrates a side elevation view of a frame hinge with the hinge mount rotated 90 degrees relative to FIG. 5 according to an embodiment of the invention;

FIG. 10 illustrates a partial side elevation view of an equipment attachment frame according to an embodiment of the invention;

FIG. 13 illustrates a perspective elevation view of a portion of the frame with a shelf member attached according to an embodiment of the invention;

FIG. 14 illustrates a partial side elevation view of the device with electronic cabling according to an embodiment of the invention;

FIG. 15 illustrates a side elevation view of a shelf member according to an embodiment of the invention;

FIG. 16 illustrates a partial perspective elevation view of a shelf member according to an embodiment of the invention.

DETAILED DESCRIPTION

Figure 1:
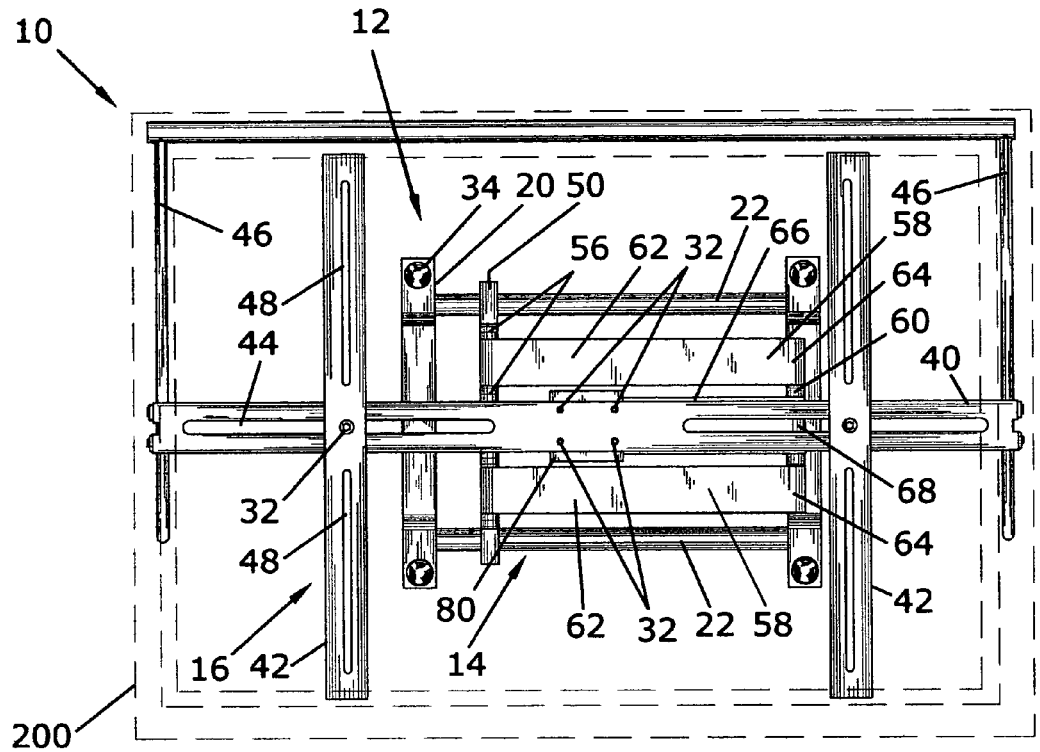
FIG. 1 illustrates a front elevation view of the electronic equipment attachment frame and a ghosted electronic display according to an embodiment of the invention.
Figure 2:
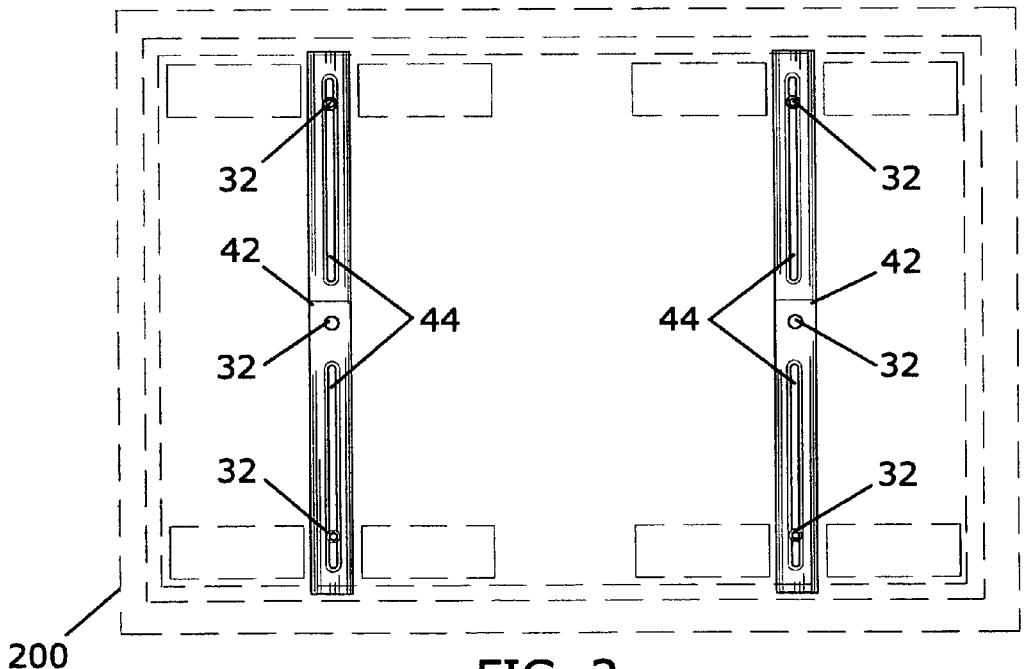
FIG. 2 illustrates a back elevation view of a pair of attachment frame members according to an embodiment of the invention.

The following detailed description represents the best currently contemplated modes for carrying out the invention. The description is not to be taken in a limiting sense, but is made merely for the purpose of illustrating the general principles of the invention.

Referring to FIGS. 1 through 4, an equipment mount 10 may have a wall mount frame 12 that may have two vertical wall mount brackets 20 that may be spaced apart for attachment by a fastener, such as, a lag bolt, inserted through wall aperture 34 to two vertical wall studs or other vertical structure. The wall mount brackets 20 may have two horizontal adjustment bars 22 inserted at each end in bar apertures 24 and retained by a set screw 26. The set screws 26 may allow adjustment in the spacing between the two wall mount brackets 20, for example, when the set screws 26 may be loosened the wall mount brackets 20 may be slid on the adjustment bars 22 to be positioned for attachment to a vertical structure, such as, to adjust for spacing between vertical wall studs. Once the wall mount brackets 20 may be positioned the set screws 26 may be tightened to firmly fix or attach the wall mount brackets 20 and adjustment bars 22 relative to each other. The adjustment bars 22 may have detents 30 for receipt of set screws 26.

There may be an articulating arm assembly 14 slidably attached on one end to the adjustment bars 22 and at a second end rotationally attached to an equipment attachment frame 16. The equipment attachment frame 16 may have a hinge frame member 40 that may be oriented generally horizontally in one position as viewed in FIG. 1. There may be two attachment frame members 42 attached by bolts 32 to the hinge frame member 40 oriented in a generally vertical position and spaced apart for attachment to a flat panel display 200, television screen or other equipment device. There may be slots 44 formed in hinge frame member 40 and attachment slots 48 in attachment frame members 42 to allow adjustment of spacing between attachment frame members 42 and to accommodate attachment of various configuration equipment. There may be a position handle 46 attached to the hinge frame member 40 that may be grasped by a user to position a flat panel display 200 or other equipment rather than having to grasp the equipment to move it. While the equipment attachment frame 16 may be illustrated and described with two attachment frame members 42, other combinations may be used. For example, one or more may be used depending on the size or weight and the number of display 200 that are to be attached. As a further example, two displays 200 may be attached side-by-side on hinge frame member 40 using two attachment frame members 42 for each display 200.

The articulating arm assembly 14 may have a wall mount hinge 50 that may be a bar structure having an upper aperture 52 and lower aperture 54 for slidable engagement with the adjustment bars 22. The wall mount hinge 50 may have two sets of hinge ears 56 positioned for attachment of a pair of first extension arms 58 at a first end 62 by bolts 32. The wall mount hinge 50 may be fixed in position by a set screw 26 that may be threadable engaged at the upper aperture 52 and lower aperture 54. The set screws 26 may be seated in detents 30. There may be an intermediate hinge 60 having a second end 64 of the first extension arms 58 and a second end 68 of a second extension arm 66 rotatably attached. As viewed in FIG. 1 this may allow the first extension arms 58 to rotate outwardly and inwardly relative to the wall mount frame 12. The second extension arm 66 may allow further relative rotation in the same plane that may be a horizontal plane as viewed in FIG. 1. This may allow a display 200 to be positioned close to a wall or at a distance spaced away from the wall.

There may be an equipment attachment frame hinge 80 attached at a first end of the second extension arm 66 and attached at the approximate center of the hinge frame member 40. The frame hinge 80 may allow side to side rotation of the equipment attachment frame 16 as well as tilting rotation in an up and down direction for positioning a display 200 for viewing.

Referring to FIGS. 5 through 7, the frame hinge 80 may have a hinge receiver 82 attached to a hinge mount 84 by bolts 32 inserted through mount apertures 86 and threaded into receiver apertures 88. The first end 70 of the second extension arm 66 may be rotatable attached to the hinge receiver 82 having ears 100 and a pivot pin 102.

The hinge mount 84 may have two tilt pin clamp jaws 110 attached and oriented to receive and grip a tilt pin 112. Each clamp jaw 110 may have a slot 114 and groove 116. There may be a pair of tension bolts 118 inserted in upper jaw aperture 120 and threaded into lower jaw aperture 122. The tilt pin 112 may have a tilt plate ear 132 of a tilt plate 130 attached at an approximate center by a tilt plate taper pin 134 by inserting the tilt plate taper pin 134 through a tilt plate ear aperture 128 for a friction fit in a tilt pin bore 126. The tilt plate ear 132 may be disposed in a tilt slot 124 between the two tilt pin clamp jaws 110. The tilt pin 112 and tilt plate 130 may be rotated in grooves 116 of the clamp jaws 110 as illustrated by the dashed lines in FIG. 5. There may be washers 136 disposed on the tilt pin 112. When the tilt plate 130 may be positioned by the user, the tension bolts 118 may be tightened to firmly position a display. The combination frame hinge 80 may allow horizontal and vertical positioning of a flat panel display.

Referring to FIGS. 5 through 9, the frame hinge 80 may have other position adjustment structure such as a hinge mount slots 104 to allow adjustment of the relative positioning of the hinge receiver 82 and the hinge mount 84. The hinge receiver 82 may have a hinge receiver plate 106 as best viewed in FIG. 8. The hinge receiver plate 106 may be generally of rectangular form to mate with the hinge mount 84. The hinge receiver plate 106 may have a rotational pin aperture 92 positioned to be opposite a rotational aperture 94 in the hinge mount 84 for insertion of a shoulder bolt 90. There may be a pair of horizontal apertures 96 and a pair of vertical apertures 98 formed in the hinge receiver plate 106 such that a center line of each pair of apertures 96, 98 would be orthogonal.

The bolts 32 inserted through mount apertures 86 may be threaded into horizontal attachment apertures 96 to position a display in a generally horizontal orientation for a user. The bolts 32 may be removed and the hinge mount 84 rotated about shoulder bolt 90 to position the mount apertures 86 opposite vertical attachment apertures 98 for fastening with bolts 32. This may position a display 90 degrees rotation from a horizontal position to a vertical position. The 90 degree rotation of the hinge mount 84 may be best viewed in FIG. 9 relative to FIG. 5. The shoulder bolt 90 may have the shoulder portion 78 positioned in rotational bolt mount aperture 94 and the threaded portion 76 threadably engaged in the rotational bolt hinge aperture 76. This may allow rotation of hinge mount 84 relative to hinge receiver plate 102 without causing the separation of the two elements.

Figures 11, 12:
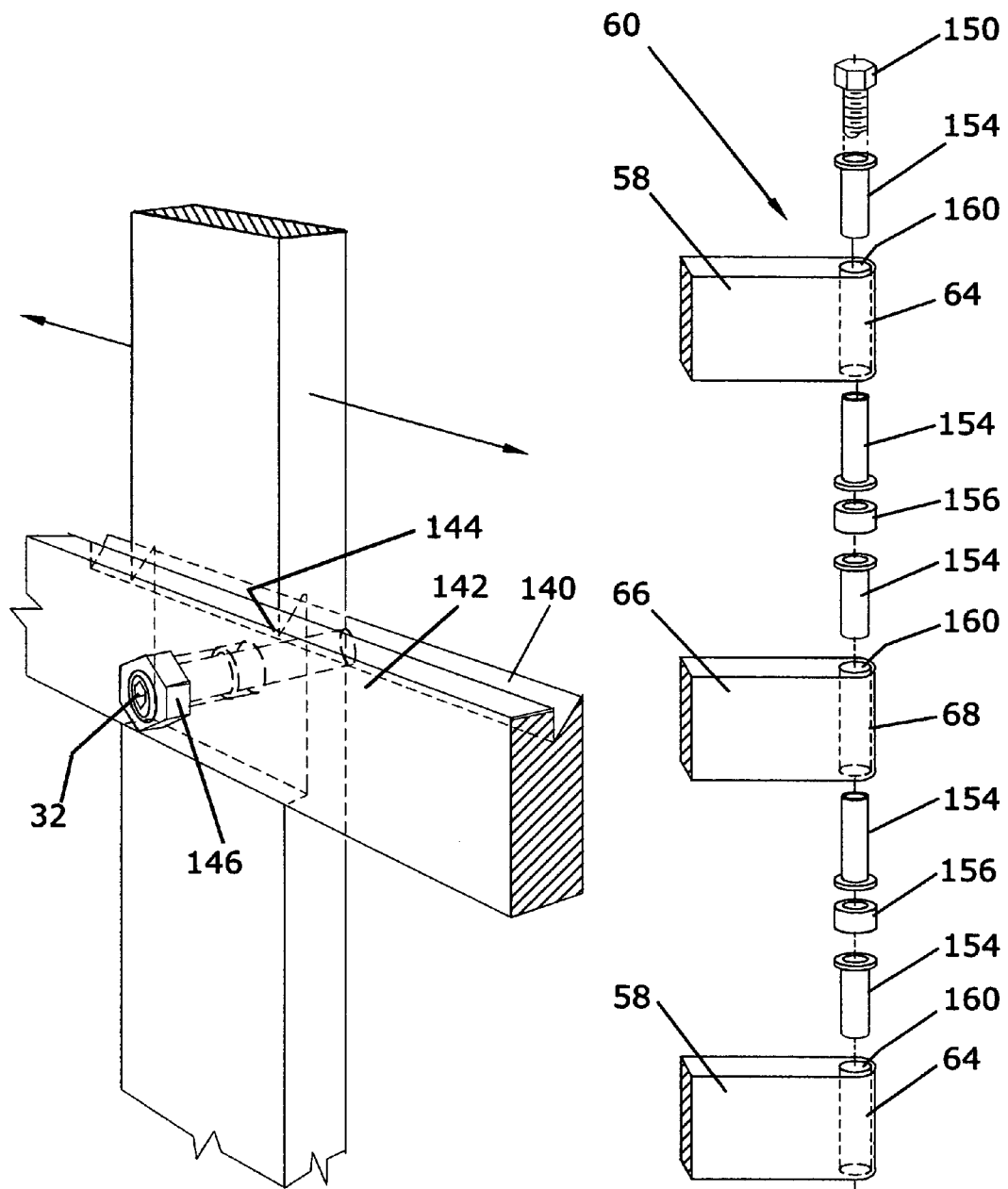
FIG. 11 illustrates a perspective partial view of an equipment attachment frame according to an embodiment of the invention.
FIG. 12 illustrates an exploded elevation view of an intermediate hinge according to an embodiment of the invention.

Referring to FIGS. 5, 10 and 11, the hinge frame member 40 may have a frame slot 140 formed in an upper surface 142 for receipt of a tongue 144 of the attachment frame members 42. This may allow attachment of the attachment frame members 42 to a flat panel display 200 and then placing the display 200 on the hinge frame member 40. The hinge frame member 40 may then be fastened to the attachment frame members 42 by hollow bolts 146 and to the display by bolts 32 inserted through the hollow bolts 146 to engage the display 200 structure. There may be an attachment frame groove 148 formed in the back surface of the attachment frame member 42 to properly position it relative to the hinge frame member 40.

Referring to FIG. 12, an exploded view of intermediate hinge 60 may be observed. The two first extension arms 58 and the second extension arm 66 may be rotatably fastened by a hinge bolt 150 and a lock nut 152 inserted through apertures 160 in second ends 64 of the first extension arms 58 and through second end 68 of the second extension arm 66. There may be hinge sleeves 154 inserted in apertures 160 to facilitate intermediate hinge 60 operation. There may also be spacers 156 positioned between hinge elements to properly position the arms 58, 66.

Referring to FIGS. 13 through 16, a shelf member 170 may be attached to a horizontal adjustment bar 22 to extend in a downwardly direction. The shelf member 170 may be a hollow tube of rectangular cross section, a "U" shape channel, or other open or hollow structure. There may be cable apertures 172 formed in the sides of the shelf member 170 to allow electronic cables 174 to be routed in and out of the shelf member 170. The shelf member 170 may be attached to the horizontal adjust bar 22 by a hook portion 176 formed adjacent a top end 178 of the shelf member 170. The hook portion 176 may have a pair of vertically offset hook openings 184 for attachment as best viewed in FIG. 16. This may require the shelf member 170 to be rotated relative to the horizontal adjustment bar 22 as illustrated in dashed line form in FIG. 16. Once the hook openings 184 are in place, the offset may inhibit accidental displacement of the shelf member 170.

There may be generally horizontal shelf slots 180 formed in the shelf member 170 for receipt and support of shelves 182. The shelf slots 180 may be sloped upwardly approximately 2 percent for retaining the shelf 182 and to accommodate flexure or bending a shelf in a downward direction when holding objects. The upper first extension arm 58 and the second extension arm 66 may have elongated cavities 190 formed therein with one side open. This may allow cables 174 to be routed through the cavities 190 to a flat panel display and the cables 174 may be retained in the cavities 190 and covered by attachment of cover plates 192.

While the invention has been particularly shown and described with respect to the illustrated embodiments thereof, it will be understood by those skilled in the art that the foregoing and other changes in form and details may be made therein without departing from the spirit and scope of the invention.

I claim:

1. A device for attachment to a vertical structural element for support of an electronic display comprising:
   a wall mount frame having two wall mount brackets spaced apart, slidably disposed and fixedly attachable on two horizontal adjustment bars inserted in said wall mount brackets having two bar apertures therein;
   an articulating arm assembly rotatably attached at a first extension arm by a wall mount hinge to said two horizontal adjustment bars; and
   an equipment attachment frame rotatably attached to a second extension arm of said articulating arm assembly by a frame hinge.

2. The device as in claim 1 wherein said equipment attachment frame comprising:
   a hinge frame member having an approximately horizontal orientation and having a plurality of slots therein;
   at least two attachment frame members spaced apart, oriented approximately vertically and attached to said hinge frame member by a fastener inserted through said plurality of slots; and
   said attachment frame members having a plurality of attachment slots for attachment to an equipment device.

3. The device as in claim 2 wherein a position handle is attached to said hinge frame member.

4. The device as in claim 1 wherein said articulating arm assembly comprising:
   a wall mount hinge slidably disposed on said adjustment bars and having a first pair of hinge ears for rotatable attachment of a first end of an upper first extension arm and a second pair of hinge ears for rotatable attachment of a first end of a lower first extension arm;
   an intermediate hinge attached to a second end of said upper first extension arm and to a second end of said lower first extension arm wherein said upper first extension arm and said lower first extension arm are spaced apart for attachment of a second end of a second extension arm to said intermediate hinge intermediate said lower first extension arm and said upper first extension arm; and
   said frame hinge rotatable attached to a first end of said second extension arm and said frame hinge attached at an approximate center of said hinge frame member.

5. The device as in claim 4 wherein said intermediate hinge comprising:
   a hinge bolt inserted through said first extension arms and said second extension arm and threadably engaged with a lock nut;
   a plurality of hinge sleeves disposed in apertures of said first extension arms and said second extension arm for receipt of said hinge bolt; and
   a plurality of spacers disposed between said first extension arms and said second extension arm on said hinge bolt to space apart said first extension arms and said second extension arm.

6. The device as in claim 4 wherein said upper first extension arm having an elongated cavity open on one side therein and said second extension arm having an elongated second cavity open on one side therein; and a cover plate attachable to each of said upper first extension arm and said second extension arm.

7. The device as in claim 4 wherein said wall mount having an upper aperture and a lower aperture for slidable engagement with said adjustment bars and a first set screw disposed relative to side upper aperture to engage an upper adjustment bar and a second set screw disposed relative to said lower aperture to engage a lower adjustment bar.

8. The device as in claim 1 wherein said frame hinge comprising:
   a hinge receiver attached by a fastener to a hinge mount;
   a first end of a second extension arm of said articulating arm assembly rotatably attached to said hinge receiver at a pair of ears;
   two clamp jaws attached to said hinge mount wherein said two clamp jaws each have a slot and a groove for receipt and gripping of a tilt pin; and
   a tilt plate ear having a tilt plate is attached to an approximate center of said tilt pin and disposed in a tilt slot.

9. The device as in claim 8 wherein each of said clamp jaws having an upper jaw aperture for insertion of a tension bolt and a lower jaw aperture for threadable engagement of said tension bolt.

10. The device as in claim 8 wherein:
    said hinge receiver having a hinge receiver plate to mate with said hinge mount;
    a shoulder bolt threadable engaged in said hinge receiver plate having a rotational bolt aperture generally centrally disposed therein and inserted in said hinge mount having a rotational aperture generally centrally disposed therein;
    and said hinge receiver plate having a pair of horizontal apertures and a pair of vertical apertures formed therein for threadable receipt of said bolts.

11. The device as in claim 8 wherein said hinge mount having a hinge mount slot disposed for lateral adjustment of said hinge mount relative to said bolt.

12. The device as in claim 1 wherein said hinge frame member having a frame slot formed in an upper surface and said attachment frame members having a tongue disposed for insertion in said frame slot.

13. The device as in claim 1 wherein a hollow bolt fastens said hinge frame member to said attachment frame members and a bolt is inserted through said hollow bolt for threadable engagement with said electronic display.

14. The device as in claim 1 wherein:
    an elongated hollow shelf member is attached adjacent a top end to a horizontal adjustment bar to extend downwardly;
    said elongated hollow shelf member having a cable aperture therein; and
    a shelf slot formed at an approximately horizontal orientation and open forwardly in said elongated hollow shelf member.

15. The device as in claim 14 wherein said elongated hollow shelf member having a pair vertically offset hook openings for attachment to said horizontal adjustment bar.

16. The device as in claim 14 wherein said shelf slots have an outwardly, upwardly sloped form of approximately 2 percent.

17. The device as in claim 14 wherein a shelf is inserted in said shelf slot.

* * * * *